April 22, 1952  E. WEISKER  2,594,238
DEMOUNTABLE AWNING OR SUNSHIELD STRUCTURE
FOR AUTOMOBILE WINDOWS
Filed Aug. 24, 1949  3 Sheets-Sheet 1
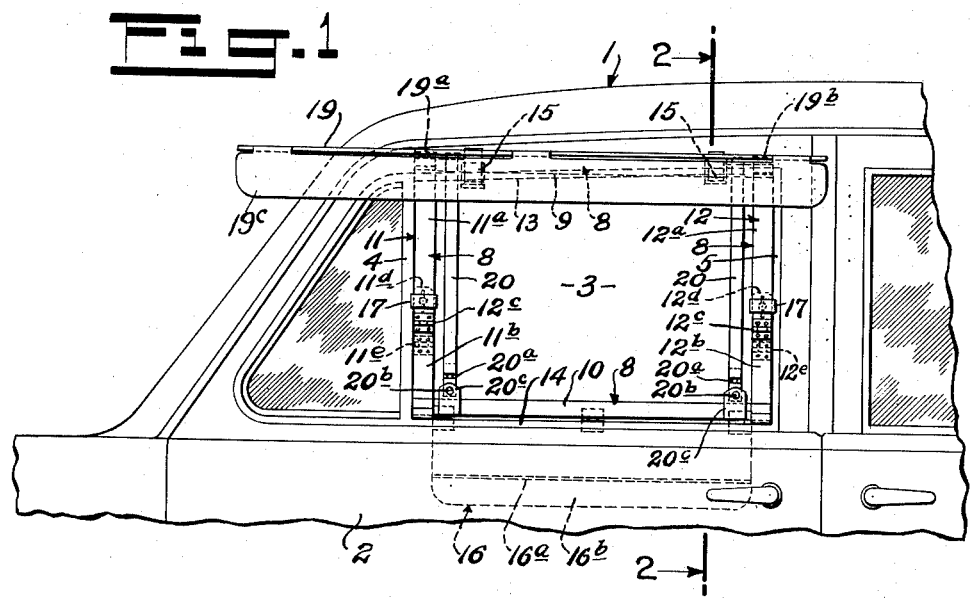
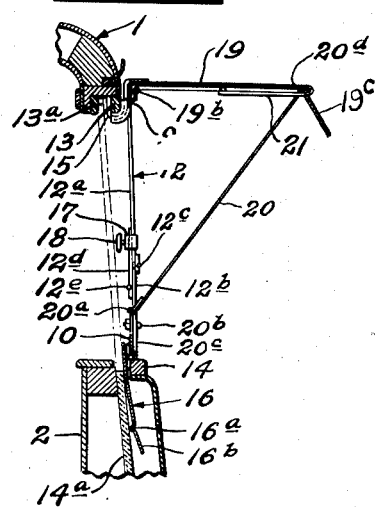
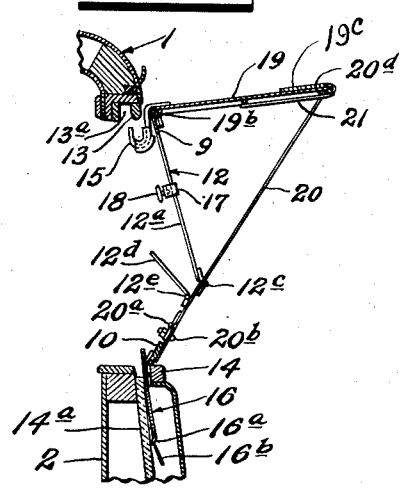
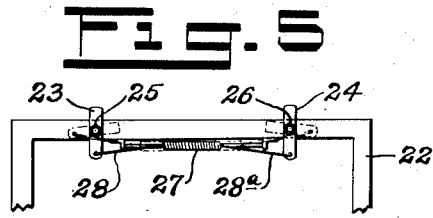
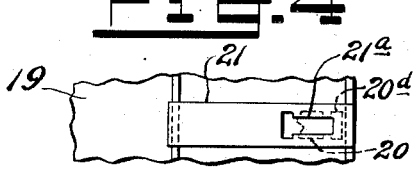
INVENTOR.
ELLIS WEISKER
BY
ATTORNEY

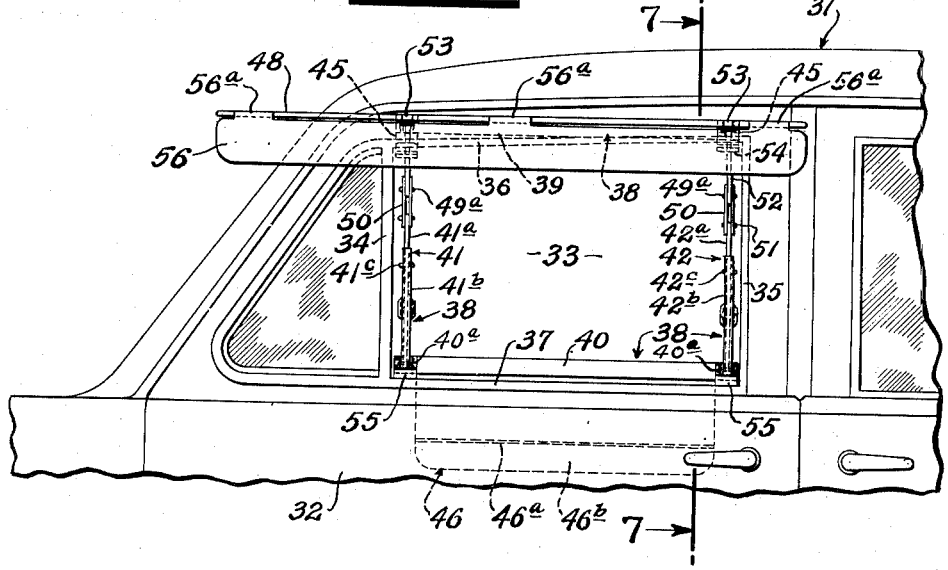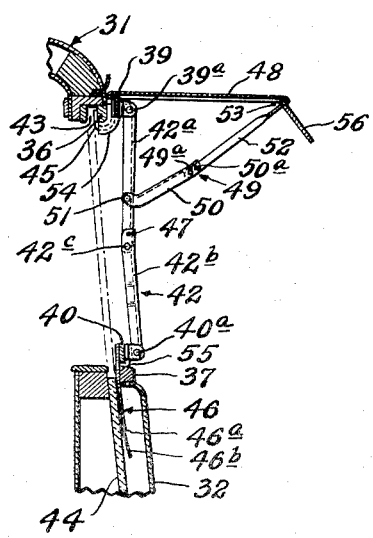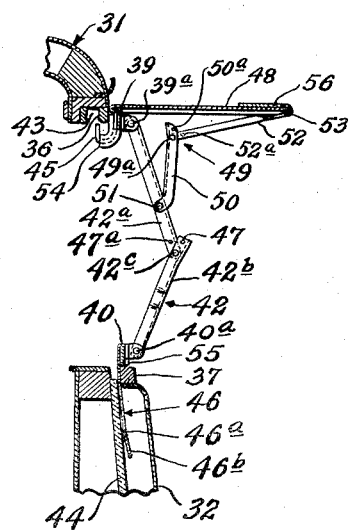

April 22, 1952
E. WEISKER
2,594,238
DEMOUNTABLE AWNING OR SUNSHIELD STRUCTURE FOR AUTOMOBILE WINDOWS
Filed Aug. 24, 1949
3 Sheets-Sheet 3
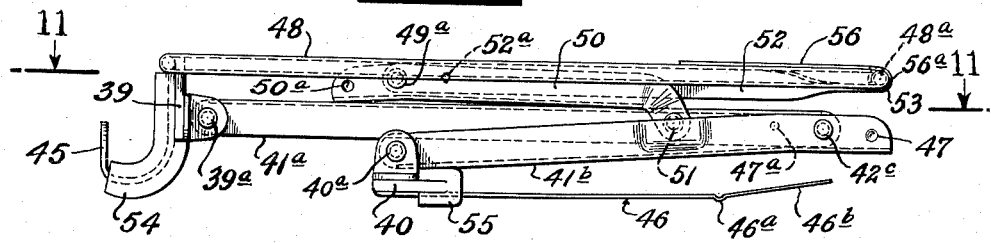
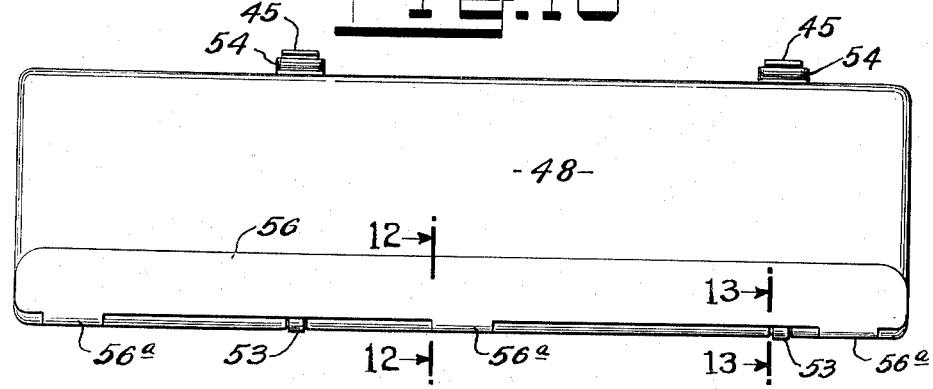
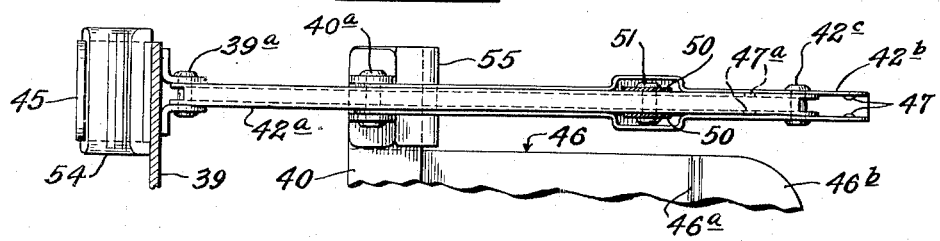
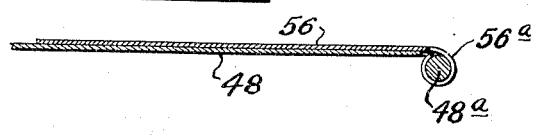
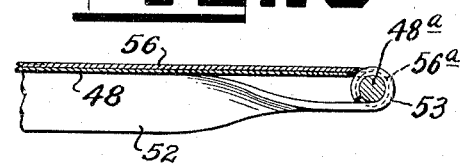
INVENTOR.
ELLIS WEISKER
BY
*Joseph F. O'Brien*
ATTORNEY Patented Apr. 22, 1952

2,594,238

UNITED STATES PATENT OFFICE 2,594,238

DEMOUNTABLE AWNING OR SUNSHIELD STRUCTURE FOR AUTOMOBILE WINDOWS

Ellis Weisker, Wells, N. Y.

Application August 24, 1949, Serial No. 112,004

3 Claims. (Cl. 296—44)

This invention relates to a demountable awning or sun-shield structure for automobile windows.

One of the objects of my invention is to provide an awning or sun-shield structure adapted to be readily, quickly and easily mounted in the window opening of an automobile for protection of the driver or other person from the rays of the sun, and to be readily, easily and quickly demounted when desired.

Another object of my invention is to provide an awning or sun-shield of the type specified which is adapted to be folded when demounted into a small package for storage in the storage compartment of an automobile.

Another object of my invention is to provide an efficient, compact awning composed of few rigid and break-resistant and foldable parts.

Another object of my invention is to provide a device composed of a single unit and to reduce to a minimum the size or magnitude thereof.

Another object of my invention is to utilize in a demountable awning structure a frame-member adapted to be demountably fitted in the window opening of an automobile and to carry at its top portion an awning member preferably foldable in relation to the frame member.

Another object of my invention is to provide a mounting structure for an awning or sun-shield of the type specified comprising a frame-member composed of articulating jointed parts engageable with the top and bottom rails of the window opening and combined at its upper portion with an awning member preferably foldably mounted in relation to said frame member.

Still another object of my invention is, in a structure of the type specified, to provide a frame member having at the bottom thereof a frame-mounting member comprising a thin engaging flange, fin or plate adapted to be inserted between the glass and the frame work of the automobile in combination with means at the top of the frame member adapted to be inserted in the glass groove at the top of the window frame to provide a retaining means at the top and bottom for attaching and holding the frame member and the awning supported thereby in proper operating position and at the same time enabling the window to be opened or closed at will.

Another object of my invention is to utilize in a thin flange of the type hereinabove specified a horizontally-disposed bevelled portion or bend adjacent to its bottom edge to permit the glass to be raised without striking the projecting glass-retaining members.

Another object of my invention is, in an awning or sun-shield device of the character specified, to utilize an awning supporting frame member comprising elements adapted to vary the height of said frame member to enable a locking in of upper and lower engaging connections to the window-frame.

Still another object of my invention is to provide a device of the character specified in which the awning-supporting frame member embodies pairs of articulating side elements, the members of each pair being pivoted together to form a toggle joint having a hinge-like elbow intermediate the ends of said pair of side elements or members and being operable by applying manual power at the junction to firmly engage the top and bottom rails of the window opening.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in side elevation of a portion of an automobile having my preferred form of awning mounted thereon;

Fig. 2 is a vertical section on the line 2—2 of Fig. 1, looking in the direction of the arrows and showing my awning in completely-mounted position;

Fig. 3 is a sectional view similar to Fig. 2 showing my awning in mounted position just before fastening of the parts;

Fig. 4 is a plan view of the under surface of the awning member showing the connection between the awning and strut;

Fig. 5 is a modified form of awning-supporting frame having at its top edge a modified form of frame fastening means;

Fig. 6 is a view in side elevation of a portion of an automobile having another modified form of awning or sun-shield mounted thereon;

Fig. 7 is a section on the line 7—7 of Fig. 6, looking in the direction of the arrows, showing the awning or sun-shield of Fig. 6 mounted in fully-operative position;

Fig. 8 is a section similar to Fig. 7 showing the modified form of awning member of Figs. 6 and 7 and its supporting frame partially released from the window-frame during removal thereof;

Fig. 9 is a view in end elevation showing the form of my device shown in Figs. 6 to 8 after removal and in folded position ready for stowing within the baggage compartment of an automobile;

Fig. 10 is a top plan view of the awning member shown in Fig. 11;

Fig. 11 is a fragmentary section on the line 11—11 of Fig. 9, looking in the direction of the arrows;

Fig. 12 is a fragmentary section on the line 12—12 of Fig. 10, looking in the direction of the arrows;

Fig. 13 is a fragmentary sectional view on the line 13—13 of Fig. 10, looking in the direction of the arrows.

Referring now to Figs. 1 to 3 of these drawings which illustrate a preferred embodiment of my invention, 1 indicates an automobile, 2 the door thereof and 3 the rectangular window in the door 2 which is bounded by side frame members 4 and 5 and top and bottom frame members 13 and 14. Mounted in the window opening 3 is an awning supporting frame member 8 comprising a top frame element 9, a bottom frame element 10 and articulating side frame elements 11 and 12, respectively, adapted upon movement to vary the distance between the top and bottom frame elements 9 and 10.

In the embodiment shown, the frame elements 9 and 10 comprise rigid horizontal bars adjustably connected together by the articulating side members 11 and 12. As shown, the opposite ends of the top and bottom frame members have rigidly connected thereto the said articulating side elements 11 and 12 which comprise portions or pairs of members 11$^a$, 11$^b$ and 12$^a$, 12$^b$. The members of each pair 11$^a$, 11$^b$ and 12$^a$, 12$^b$ are hingedly connected together at abutting ends opposite to said connections with the top and bottom frame members to provide an articulating joint having at 12$^c$ a hinged elbow disposed intermediate the ends of said side elements 11 and 12. Movement of this joint to the released position shown in Fig. 3 is adapted to reduce the distance between the said top and bottom members 9 and 10, respectively, and thus to enable, upon extension thereof, ready engagement of the said frame member with the top and bottom rails 13 and 14 of the window opening. Obviously, upon application of manual inward pressure at the said hinged elbow in the position shown in Fig. 3, the members 11 and 12 will be extended and the distance between the members 9 and 10 will be increased so that the frame may be made to engage the top and bottom rails 13 and 14 of the window, as more particularly shown in Fig. 2.

In the embodiment shown, the top rail 9 is provided with hooks 15 adapted, upon such extension, to enter the glass groove 13$^a$ of the top rail 13, and the hinged joint at 12$^c$ is, in its extended position, reinforced by providing reinforcing straps 11$^d$, 12$^d$ which, as shown, are hingedly mounted at 11$^e$, 12$^e$ on the portions 11$^b$, 12$^b$ of the members 11 and 12, and when in position across the hinge 12$^c$, as shown in Fig. 2, are preferably locked in place by a sliding ferrule or sleeve 17 and a thumb-screw 18, and in my said preferred embodiment shown I provide at the bottom of the supporting frame 8 a thin groove-engaging flange or plate 16 adapted, as shown in Figs. 2 and 3, to be inserted in the glass-groove between the pane of glass 14$^a$ and the bottom rail or sill 14 of the window 3. The use of this flange 16 enables a speedy and quick mounting of the supporting frame and its awning in the window frame opening, and in my preferred embodiment I provide the bottom portion thereof with a bead or bend 16$^a$ adapted to produce a bevel portion 16$^b$ at its base portion so as to enable the raising and lowering of the glass 14$^a$ without engaging or striking the glass-retaining elements of the door and readily permitting the glass to be raised and lowered while the frame-supporting member is in attached position and its awning supported thereby.

Mounted on the supporting frame 8 preferably unitarily with the hook 15 and foldable in released position of the frame 8 about the pivots 19$^a$, 19$^b$ is an awning or shield member 19. The awning member 19 is connected with the frame 8 and as shown the side members 11$^a$ and 12$^a$ thereof are provided at the upper ends of the portions 11$^a$, 12$^a$ with hinged connections at 19$^a$, 19$^b$ to said awning member 19. A hinged and foldable connection is thus formed between the awning 19 and the frame 8, and the outer edge of the awning 19 is held in horizontally-extended position by inclined struts 20 having hinged portions 20$^a$ at their lower ends to permit hinged movement of said inclined struts transversely of the awning member and these struts also have pivotal connections at 20$^c$ to studs 20$^b$ to permit a flat folding thereof laterally about the pivotal connection when disconnected at its upper end. The hinged extension movement enables engagement of the upper ends of struts with the under surface of the awning member 19 on which are mounted slotted key plates 21 each having a key slot 21$^a$ adapted to engage T-shaped outer end 20$^d$ to securely fasten the awning member 19 in extended position. The awning 19 is preferably provided at the outer edge thereof with a hinged flap 19$^c$.

In Fig. 5 I have shown a modified method and means for fastening the frame member to the window frame. In this view, a rigid frame member 22 on which an awning member such as 19 may be suitably mounted, is provided with oscillative engaging elements 23 and 24 pivoted at 25 and 26 and movable by a suitably-mounted spring 27 and connections 28, 28$^a$ from the disengaging positions shown in dotted lines to the engaging positions shown in full lines to fasten the rigid frame in place.

Referring now to Figs. 6 to 13 of these drawings which illustrate a modified form of my invention, 31 indicates an automobile, 32 the door thereof and 33 the rectangular window in the door 32 which is bounded by side frame members 34 and 35 and top and bottom frame members 36 and 37. Mounted in the window opening 33 is an awning supporting frame member 38 comprising a top frame element 39, a bottom frame element 40 and articulating side frame elements 41 and 42, respectively, adapted upon movement to vary the distance between the top and bottom frame elements 39 and 40.

In the embodiment shown, the frame elements 39 and 40 comprise rigid horizontal bars adjustably connected together by the articulating side members 41 and 42. As shown, the opposite ends of the top and bottom frame members have pivotally connected thereto the said articulating side elements 41 and 42 which comprise portions or pairs of members 41$^a$, 41$^b$ and 42$^a$, 42$^b$. The members of each pair 41$^a$, 41$^b$ and 42$^a$, 42$^b$ are connected together at abutting ends opposite to said pivotal connections with the top and bottom frame members to provide a toggle joint having at 42$^c$ a hinge-like elbow disposed intermediate the ends of said side elements 41 and 42. Movement of this joint to the released position shown in Fig. 8 is adapted to reduce the distance between the said top and bottom members 39 and 40, respectively, and thus to enable upon extension thereof ready engagement of the said frame member with the top and bottom rails 36 and 37 of the window opening. Obviously upon application of manual inward pressure at the said hinge-like elbow in the position shown in Fig. 8, the members 41 and 42 wil be extended and the distance between the members 39 and 40 will be increased so that the frame may be made to engage the top and bottom rails 36 and 37 of the window, as more particularly shown in Fig. 7.

In the embodiment shown, the top rail 39 is provided with hooks 45 adapted upon such extension to enter the glass groove 43 of the top rail 36, and in my said preferred embodiment shown I provide at the bottom of the supporting frame 38 a thin groove-engaging flange or plate 46 adapted, as shown in Figs. 7 and 8, to be inserted in the glass-groove between the pane of glass 44 and the bottom rail or sill 37 of the window 33. The use of this flange 46 enables a speedy and quick mounting of the supporting frame and its awning in the window frame opening, and in my preferred embodiment I provide the bottom portion thereof with a bead or bend 46a adapted to produce a bevel portion 46b at its base portion so as to enable the raising and lowering of the glass 44 without engaging or striking the glass-retaining elements of the door and readily permitting the glass to be raised and lowered while the frame-supporting member is in attached position and its awning supported thereby.

In the modified embodiment of my invention the lower elements 41b and 42b are U-shaped and the intermediately pivoted ends 41c, 42c are adapted to fit over and embrace the upper members 41a, 42a. In the modified embodiment illustrated the channel or U-shaped members 41b, 42b are provided with internally-extending teats 47 and the members 41a, 42a are provided with depressions or holes 47a which, when in the position shown in Fig. 2, will cause a releasable interlocking of said pairs of members 41a, 41b and 42a, 42b.

Mounted on the supporting frame 38 preferably unitarily with the hook 45 and foldable in released position of the frame 38 about the pivots 39a is an awning or shield member 48. The awning 48 is connected with the frame 38 and, as shown, with the side members 41a and 42a thereof by toggle-jointed strut-elements 49, each comprising a channel member 50 pivoted at 51 on the bar members 41a, 42a and a bar member 52 hinged at 53 to a frame portion 48a comprising a round rod and disposed along the outer edge of the awning or shield member 48. The strut members 50 and 52 are connected together to form a toggle-joint at 49a and are similarly provided with teats 50a and holes 52a adapted when pressure is applied to the toggle-joint 49a to cause an interlocking of the parts 50 and 52. Obviously, when manual pressure is applied in an outward direction at the toggle-joint 49a, the strut members 50 and 52 will produce a tight interlocking joint, and because of the fact that these members are stretched between the awning or shield member 48 and the frame members 41a, 42a, said frame members 41a, 42a will be rigidly held against movement until the toggle joint 49a is first released by the application of manual pressure in an inward and upward direction.

In all of the embodiments of my invention illustrated, I provide rubber bearing members 54 on the hooks 45 and rubber bearing members 55 between the bottom frame member 40 and the sill 37 to prevent any marring of the upper and lower rails of the window opening.

In operation, assuming the parts initially to be in a folded position, the frame and awning members of the embodiment shown in Figs. 1 to 3 will first be stretched into the general position shown in Fig. 3. The flange 16 will be inserted into the glass groove as shown in Figs. 2 and 3, and upon manual pressure at the hinge-joint 12c, the height of the frame will be increased and this movement will cause the hook 15 to enter the glass groove 13a in the rail 13 and because of the movement of the hinge-joint members to extended position, a holding or locking pressure will be applied between the top and bottom frame members 9 and 10 and the window frame members 13 and 14. It will only be necessary then to reinforce and lock the hinge-joint against movement as hereinabove stated.

In the embodiment shown in Figs. 6 to 13, the device is initially opened up or moved into the position shown in Fig. 8 and the toggle joint at 42c is moved into extended position by application of manual power thereto. Then, upon the further application of power at the joint 49a, the outer edge of the awning or shield will be fully supported by the toggle members 50, 52 and will be securely locked in position and at the same time the toggle members of the frame will be rigidly held against outward movement till the toggle-joint at 49a is broken.

In the preferred embodiment of my invention illustrated in Figs. 1 to 3 I provide at the outer edge of the awning member 19 a hinged flap member 19c and in the embodiment shown in Figs. 6 to 13 I have shown a flap member 56 at the outer edge of the awning or shield member 48. Both flaps are of similar construction. As illustrated, the flap member 56 is mounted on the member 48 by hinges 56a. In the construction illustrated in Figs. 6 to 8, the member 48 is formed out of a single piece of rigid material such as plastic or metal and is fastened to the rod-frame 48a along its outer edge, and this frame rod is used as the pintle for the hinges 56a while hinge bearing members are preferably formed integrally with the member 56, as shown at 56a in Figs. 7 and 8.

It will be seen that the awning-supporting frames 8 and 38 and flanges 16 and 46 in no way interfere with the operation or opening and closing movements of the window glass 14a and 44.

Having described my invention, I claim:

1. A demountable awning or sun-shield structure for automobile windows comprising a vertically-disposed awning-supporting structure adapted to engage the top and bottom frame members of the window, said awning-supporting structure having connected thereto at its lower edge a wide flange member adapted to be slidably inserted and frictionally retained in the glass groove of the window frame to provide a mounting on said window-frame for the connected awning-supporting structure, said awning-supporting structure having its said lower edge hingedly connected with the top edge of said wide frictionally-retained flange member to permit an outward folding movement of said awning supporting structure in relation to said flange when inserted in said groove, and said awning-supporting structure also being provided at its upper edge with connecting means for engagement with the fixed top member of the window frame.

2. A demountable awning or sun-shield structure for automobile windows comprising an awning-supporting structure composed of top and bottom members connected together by articulating side elements to alternately increase and reduce the distance between said top and bottom members, means on said top and bottom members for engaging the fixed top and bottom window-frame members, each of said articulating side elements being composed of two portions connected together by a hinged joint, and means for mounting an awning member on said awning-supporting structure.

3. A demountable awning or sun-shield structure for automobile windows comprising a vertically-disposed awning-supporting structure adapted to engage the top and bottom frame members of the window, said awning-supporting structure having connected thereto at its lower edge a wide flange member adapted to be slidably inserted and frictionally retained in the glass groove of the window frame to provide a mounting on said window-frame for the connected awning-supporting structure, said awning-supporting structure also being provided at its upper edge with connecting means for engagement with the fixed top member of the window frame, said slidably inserted and frictionally retained flange member being provided adjacent to its bottom edge with an integral bend to provide a bevelled portion at the bottom edge of said flange.

ELLIS WEISKER.

REFERENCES CITED

The following references are of record in the file of this patent:

UNITED STATES PATENTS

| Number | Name | Date |
|---|---|---|
| 1,392,474 | Bedard | Oct. 4, 1921 |
| 1,923,301 | Dunn | Aug. 22, 1933 |
| 1,933,478 | Karns | Oct. 31, 1933 |
| 2,199,134 | Johnson | Apr. 20, 1940 |